US010046625B2

(12) United States Patent
Hammerle

(10) Patent No.: US 10,046,625 B2
(45) Date of Patent: Aug. 14, 2018

(54) VEHICLE TOP ASSEMBLY

(71) Applicant: Theodore J. Hammerle, Johnston, IA (US)

(72) Inventor: Theodore J. Hammerle, Johnston, IA (US)

( * ) Notice: Subject to any disclaimer, the term of this patent is extended or adjusted under 35 U.S.C. 154(b) by 0 days.

(21) Appl. No.: 15/616,043

(22) Filed: Jun. 7, 2017

(65) Prior Publication Data
US 2017/0355250 A1 Dec. 14, 2017

Related U.S. Application Data

(60) Provisional application No. 62/349,206, filed on Jun. 13, 2016.

(51) Int. Cl.
B60J 3/02 (2006.01)
B60J 7/00 (2006.01)
B60J 7/08 (2006.01)
B60J 7/06 (2006.01)
B60J 11/02 (2006.01)

(52) U.S. Cl.
CPC ............. B60J 7/0015 (2013.01); B60J 7/067 (2013.01); B60J 7/085 (2013.01); B60J 11/02 (2013.01)

(58) Field of Classification Search
CPC ........ B60J 7/085; B60J 7/0015; B60J 7/1858; B60J 7/206; B60J 7/067; B60J 7/068; B60J 7/02; B60J 7/06

USPC .............. 296/219, 214, 100.16, 37.16, 98; 160/270, 266, 267.1, 269, 275, 291
See application file for complete search history.

(56) References Cited

U.S. PATENT DOCUMENTS

| 1,738,060 | A | * | 12/1929 | Barnes | ..................... | B60J 7/061 |
| | | | | | | 296/219 |
| 2,094,932 | A | * | 10/1937 | Swan | ....................... | B60J 1/205 |
| | | | | | | 160/264 |
| 4,480,675 | A | * | 11/1984 | Berkemeier | ............ | B60R 5/047 |
| | | | | | | 160/121.1 |
| 6,851,739 | B2 | | 2/2005 | Morley | | |
| 7,156,143 | B2 | * | 1/2007 | Katada | ................... | B60J 7/0015 |
| | | | | | | 160/288 |
| 7,337,823 | B2 | | 3/2008 | Wieczorek et al. | | |
| 2007/0018485 | A1 | | 1/2007 | Jacobson | | |

FOREIGN PATENT DOCUMENTS

DE        19534288        * 10/1996

* cited by examiner

Primary Examiner — Dennis H Pedder
(74) Attorney, Agent, or Firm — Zarley Law Firm, P.L.C.

(57) ABSTRACT

A vehicle top assembly having a housing and a pair of rails that are perpendicular to and extend away from the housing. A roller is rotatably mounted within the housing. A layer of material is attached to the roller and has one or more locking members attached to a side edge.

11 Claims, 2 Drawing Sheets

VEHICLE TOP ASSEMBLY

CROSS REFERENCE TO RELATED APPLICATION

This application claims the benefit to Provisional Application U.S. Ser. No. 62/349,206 filed on Jun. 13, 2016.

BACKGROUND OF THE INVENTION

This invention is directed to a top or cover for a convertible vehicle, and more particularly, a removable cover for a Jeep or the like.

Covers for convertible vehicles are well-known in the art for providing shade and protection from the elements, such as rain. Current covers are complex having many parts, expensive to produce, and are difficult to attach and remove from a vehicle. As a result, a need exists for a device that is simple in construction and has fewer parts. Also needed is a device that is inexpensive to produce. Finally, a device is needed that is easy to attach, operate and remove.

SUMMARY OF THE INVENTION

A vehicle cover assembly having a transverse housing and a pair of rails that is attached to the roll bar of a convertible vehicle. A roller is rotatably mounted within the housing that is spring loaded or operated with a crank.

A layer of material is attached to the roller at a first end. One or more locking members are attached to a side edge(s) of the layer of material. The pair of rails have one or more locking slots that have a locking catch of a locking section that selectively engage and hold the locking members in place.

DETAILED DESCRIPTION OF THE PREFERRED EMBODIMENT

Figure 1:
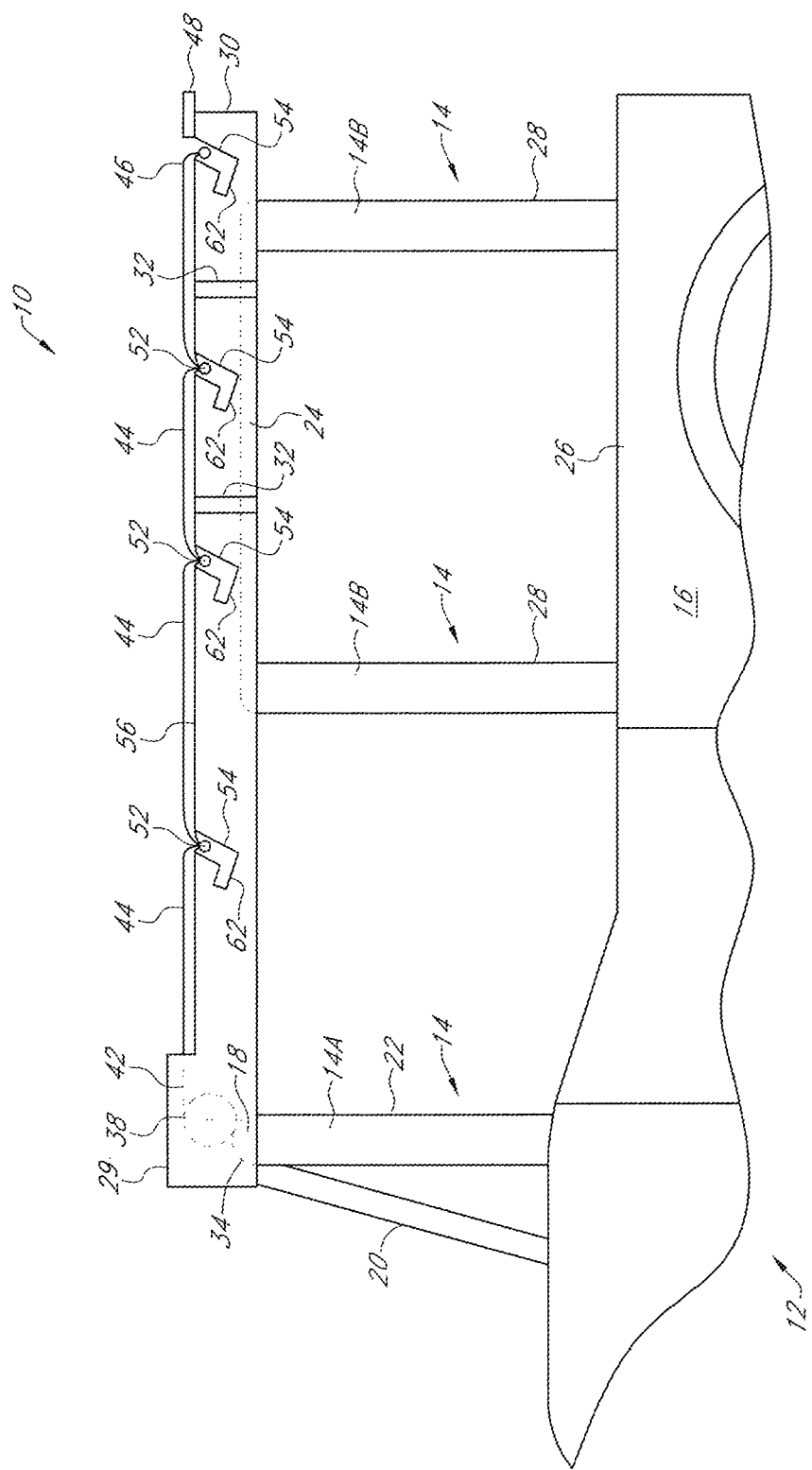
FIG. 1 is a side sectional view of a vehicle cover assembly.
Figure 2:
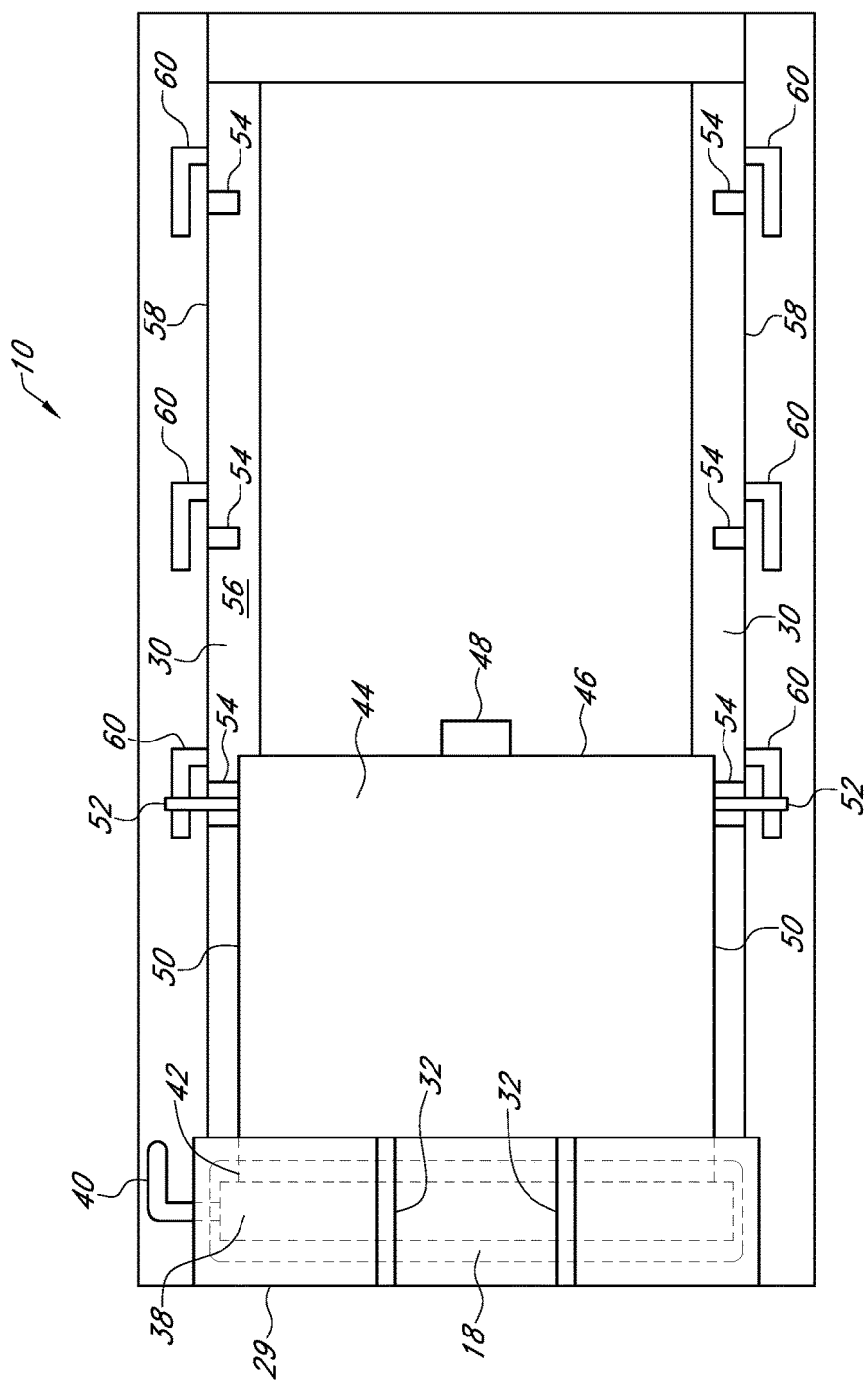
FIG. 2 is a top plan view of a vehicle cover assembly.

Referring to the figures, a vehicle top assembly 10 is used in relation to a convertible vehicle 12 having roll bars 14 that extend upwardly from a vehicle body 16. More specifically is a forward or first roll bar 14A that has a transverse section 18 that extends across the body 16 and is adjacent to the vehicle's windshield 20 and a pair of support sections 22 that extend downwardly and are connected to the body 16. A pair of second or rearward roll bars 14B extend rearwardly and transversely from the first roll bar 14A and have a longitudinal section 24 that is in spaced parallel relation to a side 26 of the body 16 and terminates in a pair of vertical support sections 28 connected to the side 26 of the body 16.

The cover assembly 10 is mounted to the transverse section 18 of roll bar 14A and longitudinal sections 24 of roll bars 14B. The cover assembly 10 includes a forward transverse housing 29 and a pair of rails 30 that extend rearwardly and perpendicularly to the housing 29. The cover assembly 10 is mounted to the roll bars 14 in any manner by a fastening member 32, such as a strap, a clamp, a lock or the like, and/or a groove 34 in the bottom of the housing 29 and the rails 30 that are formed to receive the transverse 18 and longitudinal sections 24 of the roll bars 14.

Rotatably mounted within the housing 29 is a roller 38 that is either spring loaded or attached to a crank 40 outside of the housing 29. Attached at a first end 42 to the roller 38 is a layer of material 44. The layer of material 44 is of any type including, but not limited to, moisture resistant fabric, clear pliable plastic, or slats extending between wires. At the opposite end 46 of the layer of material is a handle 48. Attached to the side edges 50 of the layer of material is one or more locking members 52, such as a pin or the like.

Positioned along the rails 30 is one or more locking slots 54. The locking slots 54 are of any size, shape, and structure and, in one example, provide an opening on a top 56 of the rails 30 that extend to an outer edge or side 58 of the rail 30. Attached to the outer side 58 is a locking catch 60 positioned to selectively engage and lock in place the locking member 52. Alternatively, the slot is formed to have a catch section 62 that selectively holds the locking member 52 in place.

In operation, the cover assembly 10 is mounted to the roll bars 14 using fastening members 32 and/or grooves 34 in the bottom of the cover assembly 10. Once mounted, the layer of material 44, using handle 48 is pulled along the rails 30, away from roller 38 to cover the body 16 of the vehicle 12. To hold the layer of material 44 in place, locking members 52 are received within locking slots 54 and are retained by the locking catch 60 and/or catch section 62.

To retract the layer of material 44, the locking members 52 are manually removed from catch member 60 and/or catch section 62. The layer of material 44 automatically retracts if the roller 38 is spring loaded. Alternatively, the layer of material 44 is retracted by manually turning crank 40.

What is claimed is:
1. A vehicle top assembly, comprising:
   a forward transverse housing;
   a pair of rails that extend rearwardly and perpendicularly to the forward transverse housing;
   a roller rotatably mounted within the forward transverse housing;
   a layer of material having a first end and side edges that is attached to the roller at the first end;
   one or more locking members attached to the side edges of the layer of material;
   one or more locking slots positioned along the pair of rails, wherein the one or more locking slots have an opening on a top of the pair of rails that extends to an outer edge of the pair of rails; and
   a locking catch attached to the outer edge of the pair of rails and is positioned to selectively engage and lock in place the one or more locking members.
2. The assembly of claim 1 further comprising a fastening member.
3. The assembly of claim 1 wherein the one or more locking members are pins.
4. The assembly of claim 1 wherein the catch section selectively holds the one or more locking members in place.
5. The assembly of claim 1 further comprising the layer of materials having a handle at an opposite end in relation to the first end.
6. The assembly of claim 1 further comprising a crank attached to the roller.
7. The assembly of claim 1 wherein the roller is spring loaded.
8. A vehicle top assembly, comprising:
   a forward transverse housing;
   a pair of rails that extend rearwardly and perpendicularly to the forward transverse housing;

a roller rotatably mounted within the forward transverse housing;

a layer of material having a first end and side edges that is attached to the roller at the first end;

one or more locking members attached to the side edges of the layer of material;

one or more locking slots positioned along the pair of rails, wherein the one or more locking slots have an opening on a top of the pair of rails that extends to an outer edge of the pair of rails; and the one or more locking slots have a catch section that selectively holds the one or more locking members in place.

9. The assembly of claim 8 further comprising the layer of materials having a handle at an opposite end in relation to the first end.

10. The assembly of claim 8 further comprising a crank attached to the roller.

11. The assembly of claim 8 wherein the roller is spring loaded.

\* \* \* \* \*